United States Patent
Zhang

(10) Patent No.: US 10,666,604 B2
(45) Date of Patent: May 26, 2020

(54) APPLICATION ACCESS METHOD AND APPLICATION ACCESS SYSTEM VIA A SPLIT DOMAIN NAME SYSTEM

(71) Applicant: BOE TECHNOLOGY GROUP CO., LTD., Beijing (CN)

(72) Inventor: Suo Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/023,281

(22) Filed: Jun. 29, 2018

(65) Prior Publication Data

US 2019/0089671 A1    Mar. 21, 2019

(30) Foreign Application Priority Data

Sep. 19, 2017   (CN) .......................... 2017 1 0846604

(51) Int. Cl.
*H04L 29/12*  (2006.01)
*H04L 29/08*  (2006.01)

(52) U.S. Cl.
CPC ........ *H04L 61/1511* (2013.01); *H04L 61/103* (2013.01); *H04L 61/106* (2013.01); *H04L 61/1552* (2013.01); *H04L 67/141* (2013.01)

(58) Field of Classification Search
CPC ............. H04L 61/1511; H04L 61/1552; H04L 67/141; H04L 61/103; H04L 61/106
See application file for complete search history.

(56) References Cited

U.S. PATENT DOCUMENTS

2002/0032799 A1*  3/2002  Wiedeman ......... H04B 7/18584
                                                709/245
2014/0204950 A1*  7/2014  Willars ............... H04L 61/1511
                                                370/392

* cited by examiner

*Primary Examiner* — Abdulkader M Alriyashi
(74) *Attorney, Agent, or Firm* — Nath, Goldberg & Meyer; Joshua B. Goldberg

(57) ABSTRACT

The preset application provides an application access method and an application access system. The method includes steps of acquiring, by an external DNS server, an outgoing link address through which a user sends an application access request, based on the application access request sent by the user and received by the external DNS server; determining, by the external DNS server, a network server to which the outgoing link address through which the user sends the application access request belongs; resolving, by the external DNS server, an outgoing link address of an application corresponding to the network server, based on the network server to which the outgoing link address through which the user sends the application access request belongs; and sending, by the external DNS server, the application access request to the application based on the resolved outgoing link address of the application, so that the user accesses the application.

4 Claims, 2 Drawing Sheets

APPLICATION ACCESS METHOD AND APPLICATION ACCESS SYSTEM VIA A SPLIT DOMAIN NAME SYSTEM

CROSS-REFERENCE TO RELATED APPLICATIONS

The present application claims priority to Chinese Patent Application No. 201710846604.1, filed on Sep. 19, 2017, the contents of which are incorporated herein by reference in the entirety.

TECHNICAL FIELD

The present disclosure relates the field of computer technology, and particularly, to an application access method and an application access system.

BACKGROUND

Generally, applications provided on the internet by companies have a plurality of outgoing links (e.g., internet connectivity links). The plurality of outgoing links have been mapped into different IP addresses (Internet Protocol Addresses), respectively. There are a lot of DNSs (Domain Name Systems) on the internet. In a case where an address of a user request is not an original IP address, but the user request has been forwarded by a DNS, or in a case where an access is performed through a proxy agent, the DNS server may obtain a forwarding address. Thus, information on a proper outgoing link cannot be obtained correctly, which limits speed of accessing the application, and also results in that the application may not be accessed properly.

SUMMARY

In an aspect, the present disclosure provides an application access method. In some embodiments, the application access method includes steps of: acquiring, by an external DNS server, an outgoing link address through which a user sends an application access request, based on the application access request sent by the user and received by the external DNS server; determining, by the external DNS server, a network server to which the outgoing link address through which the user sends the application access request belongs; resolving, by the external DNS server, an outgoing link address of an application corresponding to the network server, based on the network server to which the outgoing link address through which the user sends the application access request belongs; sending, by the external DNS server, the application access request to the application based on the resolved outgoing link address of the application, so that the user accesses the application.

In some embodiments, the application access method further includes steps of: receiving, by an internal DNS server, an application access request sent by the user; resolving, by the internal DNS server, the application access request; sending a resolved IP address of an application to the user in a case where the IP address of the application is able to be resolved by the internal DNS server; and sending the application access request to the external DNS server in a case where no IP address of the application is able to be resolved from the application access request by the internal DNS server.

In some embodiment, the step of sending the application access to the external DNS server in a case where no IP address of the application is able to be resolved from the application access request by the internal DNS server includes: in a case where no IP address of the application is able to be resolved from the application access request by the internal DNS server, sending the application access request to a firewall, such that the firewall sends the application access request to the external DNS server.

In some embodiments, the step of determining, by the external DNS server, the network server to which the outgoing link address through which the user sends the application access request belongs includes: determining, by the external DNS server, the network server to which the outgoing link address through which the user sends the application access request belongs, based on a mapping table between outgoing link addresses and network servers stored in advance in the external DNS server.

In some embodiments, the step of resolving, by the external DNS server, the outgoing link address of the application corresponding to the network server, based on the network server to which the outgoing link address through which the user sends the application access request belongs includes: resolving, by the external DNS server, the outgoing link address of the application corresponding to the same network server as the network server to which the outgoing link address through which the user sends the application access request belongs, based on a mapping table between outgoing link addresses of the application and network servers stored in the external DNS server.

In another aspect, the present disclosure provides an application access system. In some embodiments, the application access system includes an external DNS server. The external DNS server includes: an acquisition module, configured to acquire an outgoing link address through which a user sends an application access request, based on the application access request sent by the user and received by the acquisition module; a determination module, configured to determine a network server to which the outgoing link address through which the user sends the application access request belongs; a first resolving module, configured to resolve an outgoing link address of an application corresponding to the network server, based on the network server to which the outgoing link address through which the user sends the application access request belongs; and a first sending module, configured to send the application access request to the application based on the outgoing link address of the application resolved by the first resolving module, so that the user accesses the application.

In some embodiments, the application access system further includes an internal DNS server. The internal DNS server includes: a receiving module, configured to receive an application access request sent by a user; a second resolving module, configured to resolve the application access request; a second sending module, configured to send a resolved IP address of an application to the user in a case where the IP address of the application is able to be resolved by the second resolving module, such that the user accesses the application through a local area network, and to send the application access request to the external DNS server in a case where no IP address of the application is able to be resolved from the application access request by the second resolving module.

In some embodiments, in a case where no IP address of the application is able to be resolved from the application access request by the second resolving module, the second sending module is further configured to send the application access request to a firewall, such that the firewall sends the application access request to the external DNS server.

In some embodiments, the determination module is further configured to determine the network server to which the outgoing link address through which the user sends the application access request belongs, based on a mapping table between outgoing link addresses and network servers stored in advance in the determination module.

In some embodiments, the first resolving module is further configured to resolve the outgoing link address of the application corresponding to the same network server as the network server to which the outgoing link address through which the user sends the application access request belongs, based on a mapping table between outgoing link addresses of the application and network servers stored in the first resolving module.

In another aspect, the present disclosure further provides a computing device including a memory and one or more processors coupled to the memory. The memory stores computer executable instructions, when executed, to cause the one or more processes to perform one or more steps of the method described herein.

In another aspect, the present disclosure further provides a computer program product having instructions, and when the instructions of the computer program product are executed by a processor, the instructions cause the processor to perform one or more steps of the method described herein.

In another aspect, the present disclosure further provides a non-transitory computer-readable storage medium having instructions stored thereon, when the instructions being executed by a processor, to cause the processor to perform one or more steps of the method described herein.

DETAILED DESCRIPTION

To make those skilled in the art better understand the technical solutions of the present disclosure, the present disclosure will be further described below in detail in conjunction with the accompanying drawings and specific embodiments.

Figure 1:
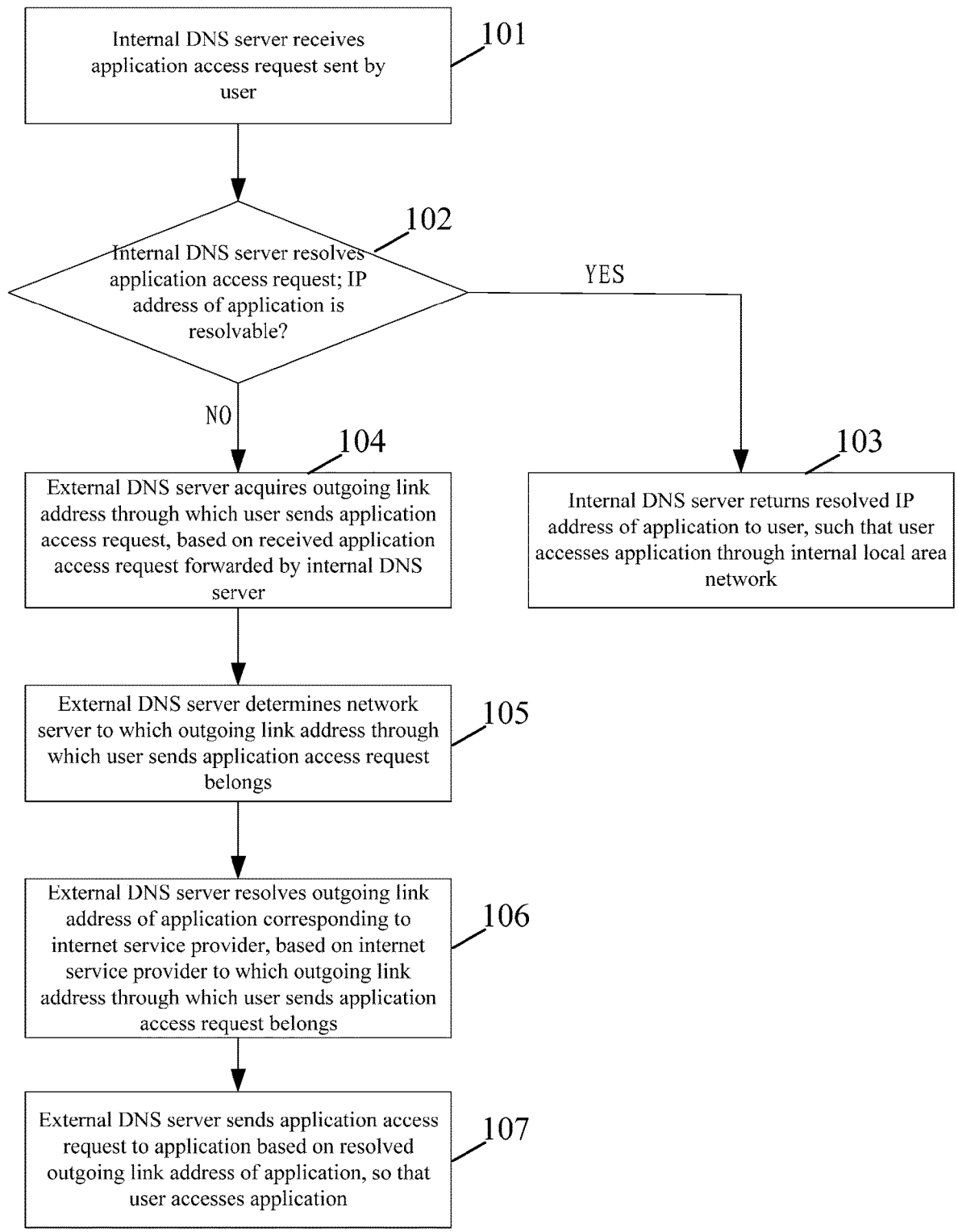
FIG. 1 is a flow chart illustrating an application access method according to some embodiments of the present disclosure.

In an aspect, the present disclosure provides an application access method. FIG. 1 is a flow chart illustrating an application access method according to some embodiments of the present disclosure. As illustrated in FIG. 1, in some embodiments, the application access method may include the following steps of 101 to 107.

At step 101, an internal DNS server receives an application access request sent by a user.

Here, a case where the user is an internal user of a company will be described by way of example. In this case, the internal DNS server is an internal DNS server of the company. Needless to say, the application access method in embodiments of the present disclosure is not limited to the example in which an internal user of a company accesses an application.

At step 102, the internal DNS server resolves the application access request sent by the user and received by the internal DNS server. In a case where an IP address of an application is able to be resolved by the internal DNS server, it indicates that the application is an internal application (i.e., an internal application of the company where the user works), and the process proceeds to step 103. At step 103, the internal DNS server returns the resolved IP address of the application to the user, such that the user accesses the application through an internal local area network. In a case where no IP address of the application is able to be resolved by the internal DNS server, it indicates that the application is not an internal application of the company, and in this case, the application access request sent by the user is sent to an external DNS server to resolve the application access request, such that the user can access the application. Herein, the external DNS server refers to a DNS server deployed on the Internet. In some embodiments, when the internal DNS server forwards the application access request sent by the user to the external DNS server, the internal DNS server sends the application access request to a firewall, such that the firewall sends the application access request to the external DNS server. By having the firewall to forward the user access request to the external DNS server, information safety can be ensured. In addition, a load balancing can be performed on the outgoing links by the fire wall, and network traffic can be weighted at each outgoing link, thereby improving speed of accessing the application by the user.

At step 104, the external DNS server acquires an outgoing link address through which the user sends the application access request, based on the application access request forwarded by the internal DNS server and received by the external DNS server.

Next, at step 105, the external DNS server determines a network server (i.e., an internet service provider) to which the outgoing link address through which the user sends the application access request belongs.

Specifically, at step 105, the external DNS server determines the internet service provider to which the outgoing link address through which the user sends the application access request belongs, based on a mapping table between outgoing link addresses and internet service providers stored in advance in the external DNS server. For example, an internet service provider corresponding to an outgoing link address ISP1 of a user is an internet service provider A, an internet service provider corresponding to an outgoing link address ISP2 of the user is an internet service provider B, and an internet service provider corresponding to an outgoing link address ISP3 of the user is an internet service provider C. Then, in a case where the outgoing link address of the application access request sent by the user is acquired as ISP1 by the external DNS server at step 104, the external DNS server determines, by looking up the table, the internet service provider through which the user sends the application access request is the internet service provider A.

Next, at step 106, the external DNS server resolves an outgoing link address of the application corresponding to the internet service provider, based on the internet service provider to which the outgoing link address through which the user sends the application access request belongs.

Specifically, the application has different outgoing link addresses for different internet service providers to optimize speed of accessing the application. The external DNS server resolves at step 106 the outgoing link address of the application corresponding to the same internet service provider as the internet service provider to which the outgoing link address through which the user sends the application access request belongs, based on a mapping table between outgoing link addresses of the application and internet service providers stored in the external DNS server. For example, the internet service provider, to which the outgoing link address through which the user sends the application access request belongs, is the internet service provider A, then the external DNS server can acquire the outgoing link address of the application corresponding to the internet service provider A by looking up the table.

Next, at step 107, the external DNS server sends the application access request to the application so that the user accesses the application, based on the resolved outgoing link address of the application. Here, it should be noted that the external DNS server may also resolve the IP address of the application and return it to the user when the user is to access the application, so that the user accesses the application through the IP address of the application.

In the application access method in embodiments of the present disclosure, based on the determined internet service provider to which the outgoing link address through which the user sends the application access request belongs, the application access request sent by the user of the company is sent to the outgoing link address of the accessed application of a corresponding internet service provider. It can avoid low access speed due to the access through a different internet service provider, and improve speed of accessing internet application of the company.

The application access method in embodiments of the present disclosure is suitable for accessing the internet application of a company from the inside of the company or from other companies. Next, the application access method in some embodiments of the present disclosure will be described in detail in conjunction with the following non-limiting example.

Figure 2:
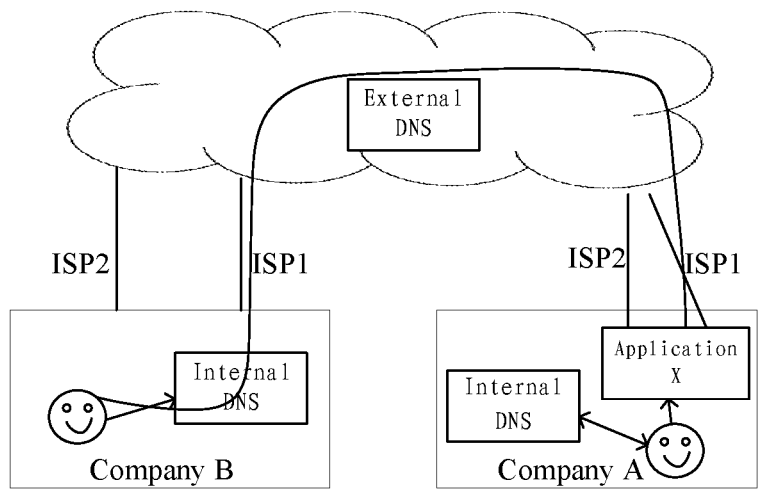
FIG. 2 is a schematic diagram illustrating an application access method according to some embodiments of the present disclosure.

FIG. 2 is a schematic diagram illustrating an application access method according to some embodiments of the present disclosure. As illustrated in FIG. 2, an example in which an internal user of a company B is to access an application (of a company A or a company B) is shown. Moreover, the company A and the company B each has two outgoing link addresses ISP1 and ISP2 belonging to two internet service providers, respectively.

First, an internal DNS server of the company B receives an application access request sent by the internal user of the company B.

Next, the internal DNS server of the company B resolves the application access request sent by the internal user of the company B. In a case where an IP address of a corresponding application is able to be resolved by the internal DNS server of the company B, it indicates that the application is an internal application of the company B, and at this time, the internal DNS server returns the resolved internal IP address of the application to the user of the company, such that the user can access the application through an internal local area network. In a case where no IP address of the application is able to be resolved by the internal DNS server of the company B, it indicates that the application is an external application of the company B, that is, the application to be accessed is an application X of the company A, as illustrated in FIG. 2. In this case, the application access request sent by the user of the company B is sent to an external DNS server through ISP1, and the external DNS server receives the application access request sent by the user of the company B.

Next, the external DNS server resolves an IP address of the user based on the received application access request sent by the user of the company B, and acquires the outgoing link address, through which the user sends the application access request, as ISP1. Here, one IP address of a user is mapped into one outgoing link address.

Next, the external DNS server determines an internet service provider to which the outgoing link address ISP1 belongs, based on the outgoing link address ISP1 through which the user of the company B sends the application access request and a mapping table between outgoing link addresses and internet service providers stored in advance in the external DNS server.

Next, the external DNS server resolves an outgoing link address of the company A corresponding to a same internet service provider, based on the determined internet service provider to which the outgoing link address through which the user sends the application access request belongs.

Next, the external DNS server sends the application access request to the application based on the resolved outgoing link address of the application, so that the user accesses the application. That is to say, in a case where the application access request is sent through the outgoing link address ISP1 of the company B, then the application is accessed through the outgoing link address ISP1 of the company A. Here, it should be noted that the external DNS server may also resolve the IP address of the application and return it to the user when the user is to access the application, so that the user accesses the application through the resolved IP address of the application.

Figure 3:
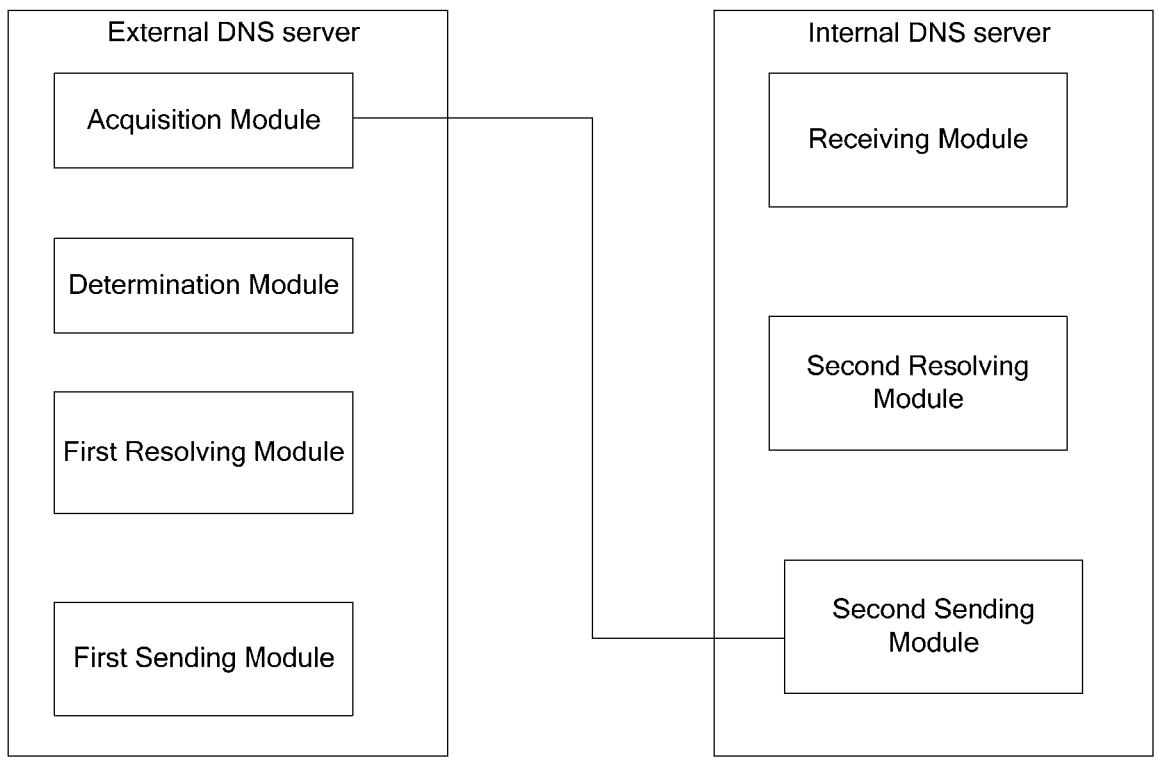
FIG. 3 is a schematic diagram illustrating an application access system according to some embodiments of the present disclosure.

In another aspect, the present disclosure further provides an application access system. FIG. 3 is a schematic diagram illustrating an application access system according to some embodiments of the present disclosure. As illustrated in FIG. 3, in some embodiments, the application access system includes an internal DNS server and an external DNS server. In some embodiments, as illustrated in FIG. 3, the external DNS server may include an acquisition module, a determination module, a first resolving module and a first sending module.

The acquisition module may be configured to acquire an outgoing link address through which a user sends an application access request, based on the application access request sent by the user and received by the acquisition module.

The determination module may be configured to determine a network server (an internet service provider) to which the outgoing link address through which the user sends the application access request belongs.

In some embodiments, the determination module may be configured to determine an internet service provider to which the outgoing link address through which the user sends the application access request belongs, based on a mapping table between outgoing link addresses and internet service providers stored in advance in the determination module.

The first resolving module may be configured to resolve an outgoing link address of an application corresponding to the internet service provider, based on the internet service provider to which the outgoing link address through which the user sends the application access request belongs.

In some embodiments, the first resolving module may be configured to resolve the outgoing link address of the application corresponding to the same internet service provider as the internet service provider to which the outgoing link address through which the user sends the application access request belongs, based on a mapping table between outgoing link addresses of the application and internet service providers stored in the first resolving module.

The first sending module may be configured to send the application access request to the application based on the outgoing link address of the application resolved by the first resolving module, so that the user accesses the application.

In some embodiments, as illustrated in FIG. 3, the internal DNS server may include a receiving module, a second resolving module and a second sending module.

The receiving module may be configured to receive an application access request sent by the user.

The second resolving module may be configured to resolve the application access request.

The second sending module may be configured to send a resolved IP address of an application to the user in a case where the IP address of the application is able to be resolved by the second resolving module, such that the user accesses the application through a local area network, and to send the application access request to the external DNS server in a case where no IP address of the application is able to be resolved by the second resolving module.

In some embodiments, in a case where no IP address of the application is able to be resolved by the second resolving module, the second sending module is further configured to send the application access request to a firewall, such that the firewall sends the application access request to the external DNS server.

In the application access system in the embodiments of the present disclosure, a user may access an application by using the application access method described herein. That is, based on the determined internet service provider to which the outgoing link address through which the user sends the application access request belongs, the application access request sent by the user of the company is sent to the outgoing link address of the accessed application of a corresponding internet service provider. It can avoid low access speed due to access through a different internet service provider, and improve speed of accessing internet application of the company.

In the description of the present specification, the description referring to the terms "one embodiment", "some embodiments", "an example", "a specific example", "some examples" or the like means specific features, structures, materials, or features described in conjunction with the embodiment or example are included in at least one embodiment or example of the present disclosure. In this specification, the schematic representation of the above terms does not necessarily have to refer to the same embodiment or example. Furthermore, the particular features, structures, materials, or characteristics described may be combined in any suitable manner in any one or more of the embodiments or examples. In addition, those skilled in the art may combine and incorporate different embodiments or examples and features thereof described in this specification without conflicting with each other.

Furthermore, the terms "first" and "second" are used for descriptive purposes only, and are not to be construed as indicating or implying relative importance or implicitly indicating the number of indicated technical features. Thus, features defined as "first", "second" may explicitly or implicitly include at least one such feature. In the description of the present disclosure, the meaning of "plurality" is at least two, such as two, three, etc., unless specifically defined otherwise.

Any process or method described in the flowcharts or otherwise described herein may be read to mean modules, sections, or portions of code that represent executable instructions that include one or more steps for implementing a custom logic function or process, and the scope of the preferred embodiment of the present disclosure includes additional implementations in which functions may be performed in a sequence that is not shown or discussed, including in a substantially simultaneous manner or in reverse order depending on the function involved, which will be understood by those skilled in the art to which the embodiments of the present disclosure pertain.

The logic and/or steps represented in the flowchart or otherwise described herein, for example, may be considered as a sequence listing of executable instructions for implementing logical functions, and may be embodied in any computer-readable medium, for use by, or in conjunction with, an instruction execution system, device, or apparatus (e.g., a computer-based system, a system including a processor, or other system that can fetch instructions from, and execute instructions from, an instruction execution system, device, or apparatus). For the purposes of this specification, a "computer-readable medium" can be any means that can contain, store, communicate, propagate, or transport the program for use by or in conjunction with the instruction execution system, device, or apparatus. More specific examples (non-exhaustive listings) of a computer-readable medium include the following: an electrical connection (electronic device) having one or more wires, a portable computer disk cartridge (magnetic device), random access memory (RAM), Read-only memory (ROM), erasable editable read-only memory (EPROM or flash memory), fiber optic devices, and portable compact disk read-only memory (CDROM). In addition, the computer-readable medium may even be paper or other suitable medium on which the program may be printed, as it may be scanned optically, for example, on paper or other media, followed by editing, interpretation, or other suitable processing manner if necessary, to obtain the program electronically and then store the program in computer memory.

Portions of the present disclosure may be implemented in hardware, software, firmware, or a combination thereof. In the above embodiments, a plurality of steps or methods may be implemented using software or firmware stored in a memory and executed by a suitable instruction execution system. For example, if implemented in hardware, as in another embodiment, it can be implemented using any one or a combination of the following techniques known in the art: discrete logic circuit having logic gate circuits for implementing logic functions on data signals, Central Processing Units (CPUs), Digital Processors (DSPs), Application Specific Integrated Circuits (ASICs), Programmable Gate Arrays (PGAs), Field Programmable Gate Arrays (FPGAs), etc. with suitable combinational logic gate circuits.

The application access method and the application access system described in the present disclosure can be suitable for various networks, for example, wireless network, wired network, and/or any combination of wireless network and wired network. The network may include a local area network, the Internet, a telecommunications network, the Internet of Things based on the Internet and/or a telecommunications network, and/or any combination of the above networks, and the like. The wired network may use, for example, twisted pair, coaxial cable, or optical fiber transmission for communication. The wireless network may use, for example, a 3G/4G/5G mobile communication network, Bluetooth, Zigbee, or Wi-Fi.

Persons of ordinary skill in the art may understand that all or part of steps carried in the method of implementing the foregoing embodiments may be instructed by a program to instruct the relevant hardware, and the program may be stored in a computer-readable storage medium. When executed, the program includes one or a combination of the steps of the method embodiments.

In addition, each functional unit in each embodiment of the present disclosure may be integrated in one processing module, or each unit may exist alone physically, or two or more units may be integrated in one module. The above integrated module can be implemented in the form of hardware or in the form of a software function module. The integrated module can also be stored in a computer readable storage medium if it is implemented in the form of a software functional module and sold or used as an independent product.

The above-mentioned storage medium may be a read-only memory, a magnetic disk, an optical disk, or the like. Although embodiments of the present disclosure have been shown and described above, it will be understood that the above embodiments are exemplary and not to be construed as limiting the present disclosure, and that those of ordinary skill in the art may make variations, modifications, substitutions and changes to the above embodiments within the scope of the present disclosure.

What is claimed is:

1. An application access method, comprising steps of:
   receiving, by an external Domain Name System (DNS) server, a first application access request sent by a user, the first application access request being sent to the external DNS server via a first outgoing link address;
   acquiring, by the external DNS server, the first outgoing link address based on the first application access request;
   determining, by the external DNS server, an internet service provider to which the first outgoing link address belongs;
   resolving, by the external DNS server, a second outgoing link address of an application corresponding to the internet service provider based on the internet service provider; and
   sending, by the external DNS server, the first application access request to the application based on the second outgoing link address, such that the user accesses the application,
   wherein before the step of receiving, by an external DNS server, a first application access request sent by a user, the method further comprises steps of:
   receiving, by an internal DNS server, a second application access request sent by the user;
   resolving, by the internal DNS server, the second application access request; and
   sending the second application access request to the external DNS server as the first application access request, wherein the step of sending the second application access request to the external DNS server as the first application access request, comprises:
   sending the second application access request to a firewall, such that the firewall sends the second application access request to the external DNS server as the first application access request,
   wherein the step of determining, by the external DNS server, an internet service provider to which the first outgoing link address belongs, comprises:
   determining, by the external DNS server, the internet service provider based on a mapping table between outgoing link addresses and internet service providers stored in advance in the external DNS server,
   wherein the step of resolving, by the external DNS server, a second outgoing link address of an application corresponding to the internet service provider based on the internet service provider, comprises:
   resolving, by the external DNS server, the second outgoing link address based on the mapping table.

2. An application access system, comprising an external Domain Name System (DNS) server and an internal DNS server, wherein the external DNS server comprises a first processor and a first memory, the first memory storing first instructions, which when executed by the first processor, cause the first processor to perform steps of:
   receiving a first application access request sent by a user, the first application access request being sent to the external DNS server via a first outgoing link address;
   acquiring the first outgoing link address based on the first application access request;
   determining an internet service provider to which the first outgoing link address belongs;
   resolving a second outgoing link address of an application corresponding to the internet service provider based on the internet service provider; and
   sending the first application access request to the application based on the second outgoing link address, such that the user accesses the application,
   wherein the internal DNS server comprises a second processor and a second memory, the second memory storing second instructions, which when executed by the second processor, cause the second processor to perform steps of:
   receiving a second application access request sent by the user;
   resolving the second application access request;
   sending a resolved IP address of the application to the user when the IP address of the application is resolvable from the second application access request; and
   sending the second application access request to the external DNS server as the first application access request, when no IP address of the application is resolvable from the second application access request,
   wherein the step of sending the second application access request to the external DNS server as the first application access request, when no IP address of the application is resolvable from the second application access request, comprises:
   sending the second application access request to a firewall, such that the firewall sends the second application access request to the external DNS server as the first application access request,
   wherein the step of determining an internet service provider to which the first outgoing link address belongs, comprises:
   determining the internet service provider based on a mapping table between outgoing link addresses and internet service providers stored in advance in the external DNS server,
   wherein the step of resolving a second outgoing link address of an application corresponding to the internet service provider based on the internet service provider, comprises:
   resolving the second outgoing link address based on the mapping table.

3. A computing device, comprising a memory and one or more processors coupled to the memory, the memory storing computer executable instructions, when executed, to cause the one or more processes to perform the steps of the method of claim 1.

4. A non-transitory computer-readable storage medium having instructions stored thereon, when the instructions being executed by a processor, to cause the processor to perform the steps of the method of claim 1.

* * * * *